(12) United States Patent
Azarian

(10) Patent No.: US 6,910,447 B1
(45) Date of Patent: Jun. 28, 2005

(54) PET COMMUNICATION APPARATUS

(76) Inventor: David Lee Azarian, 500 Hughes Rd., New Milford, NJ (US) 07646

(*) Notice: Subject to any disclaimer, the term of this patent is extended or adjusted under 35 U.S.C. 154(b) by 65 days.

(21) Appl. No.: 10/700,950

(22) Filed: Oct. 31, 2003

(51) Int. Cl.[7] .......................... A01K 29/00; H04M 9/00
(52) U.S. Cl. .................. 119/719; 119/908; 379/102.02; 379/159; 379/388.06
(58) Field of Search .................. 119/712, 905, 908, 119/719, 859; 379/160, 56.3, 388.06, 159, 379/102.02

(56) References Cited

U.S. PATENT DOCUMENTS

| | | | |
|---|---|---|---|
| 3,904,834 A | * | 9/1975 | Shinoi et al. ................ 379/159 |
| 4,507,524 A | * | 3/1985 | Yun ....................... 379/388.06 |
| 4,543,665 A | * | 9/1985 | Sotelo et al. ............... 379/56.3 |
| 4,706,274 A | * | 11/1987 | Baker et al. ................ 379/160 |
| 5,454,350 A | | 10/1995 | Betheil |
| 5,528,666 A | | 6/1996 | Weigand et al. |
| 6,178,923 B1 | * | 1/2001 | Plotkin ........................ 119/719 |
| 6,369,698 B1 | | 4/2002 | Valente |
| 6,615,770 B2 | * | 9/2003 | Patterson et al. ........... 119/719 |
| 2003/0190022 A1 | * | 10/2003 | Lee et al. .............. 379/102.02 |

* cited by examiner

Primary Examiner—Robert P. Swiatek

(57) ABSTRACT

A pet communication apparatus for allowing a user to communicate with a pet. The pet communication apparatus includes a housing member being designed for being selectively positioned on a support surface. A processing assembly is positioned in the housing member. The processing assembly is designed for being operationally coupled to a telephone jack whereby the processing assembly is operationally coupled to a telephone company. A speaker member is operationally coupled to the processing assembly whereby the speaker member is designed for audibly reproducing audio spoken by the user calling the pet. The speaker member is coupled to the housing member whereby the speaker member is designed for audibly reproducing sounds to be heard by the pet.

10 Claims, 3 Drawing Sheets

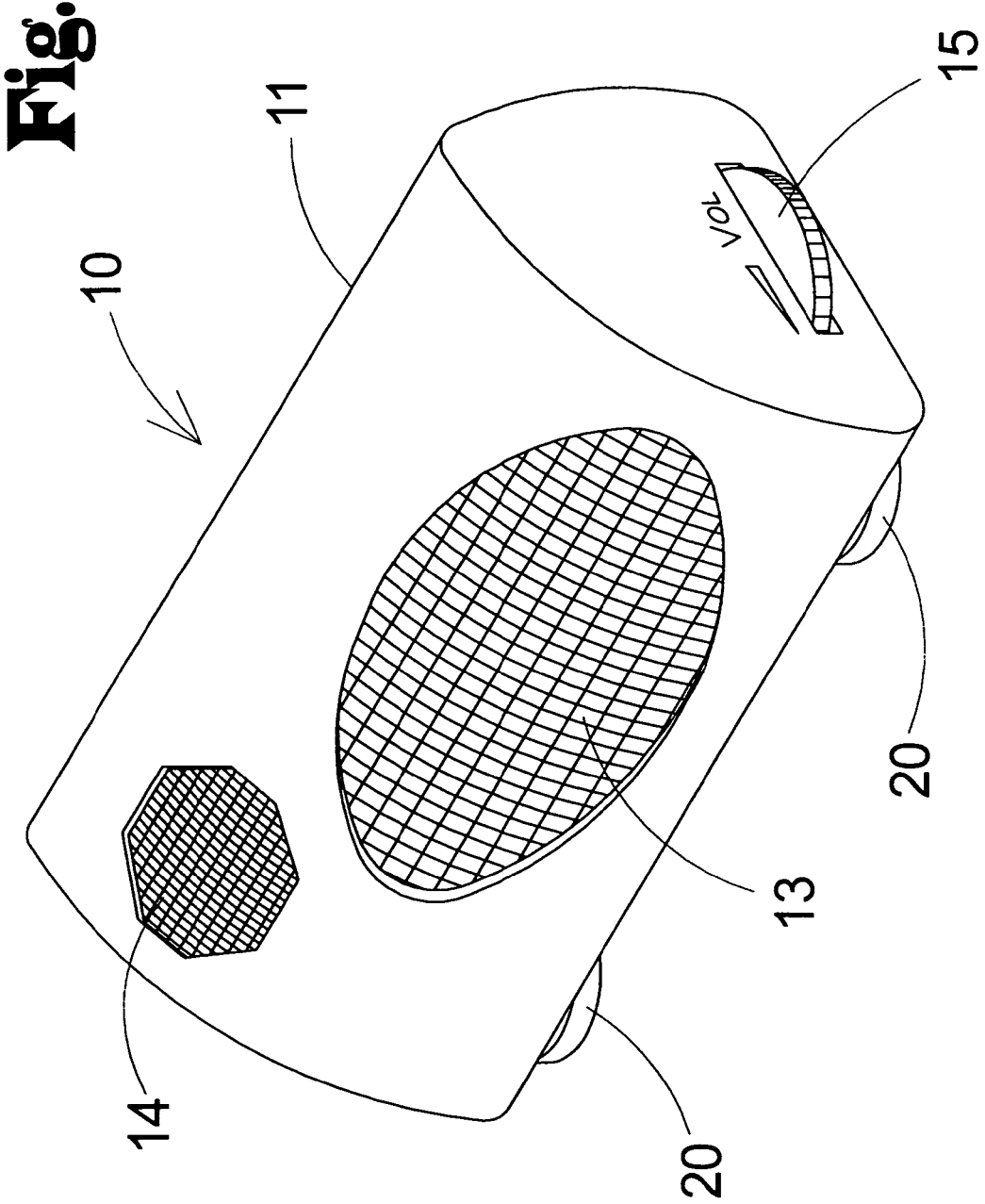

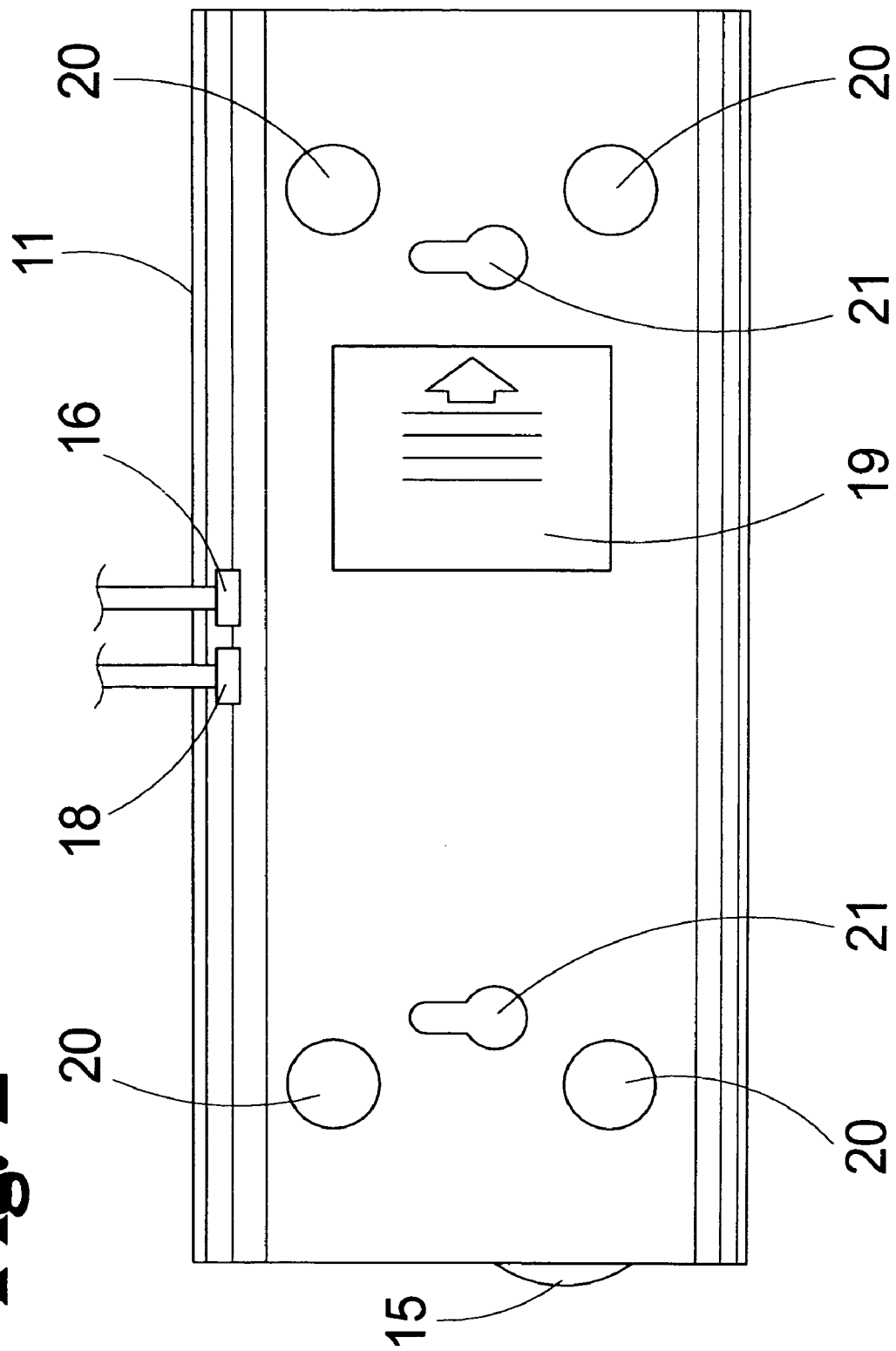

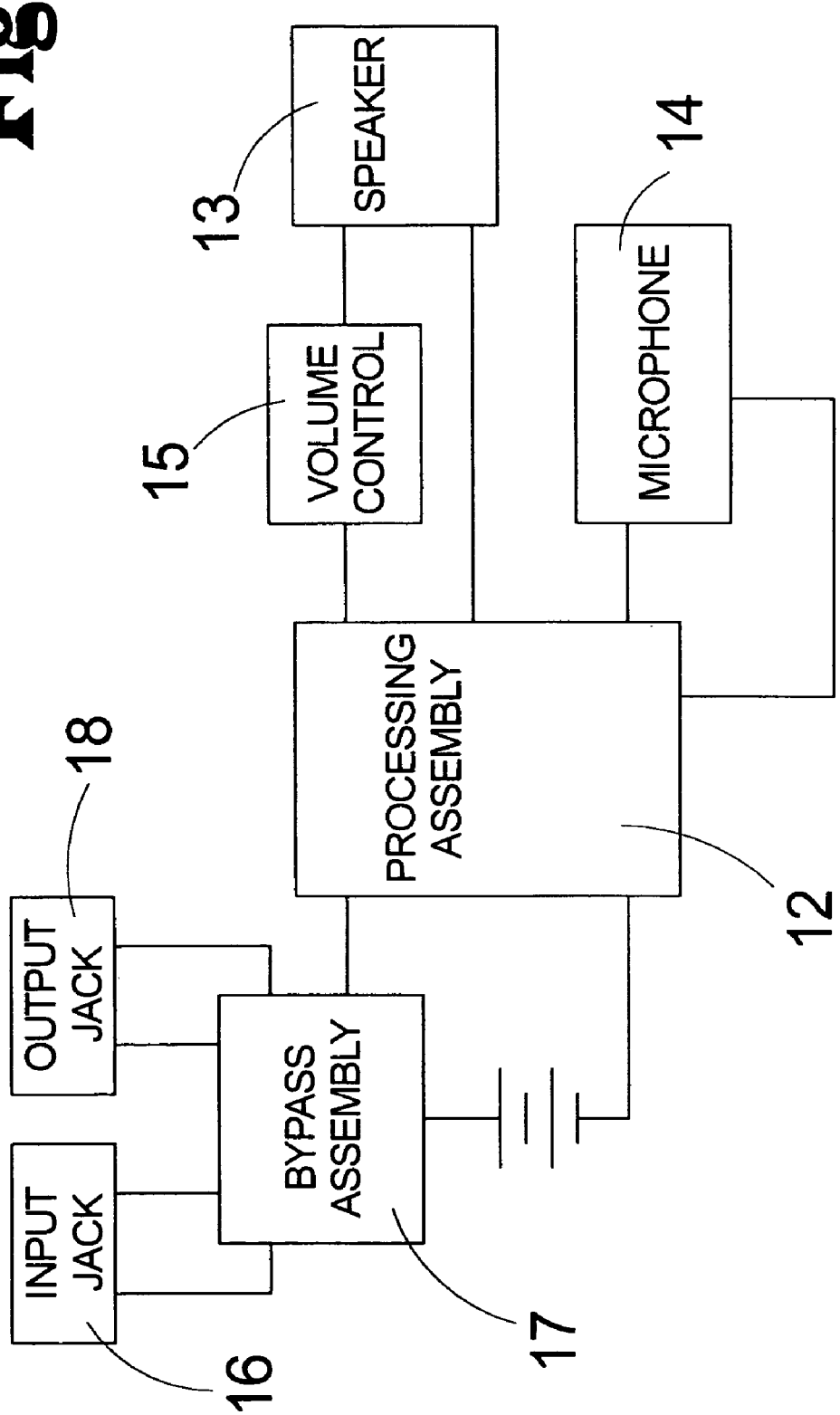

PET COMMUNICATION APPARATUS

BACKGROUND OF THE INVENTION

1. Field of the Invention

The present invention relates to personal phone expansion systems and more particularly pertains to a new pet communication apparatus for allowing a user to communicate with a pet.

2. Description of the Prior Art

The use of personal phone expansion systems is known in the prior art. U.S. Pat. No. 6,369,698 describes a device for providing interval playbacks of a message for pets and infants. Another type of personal phone expansion system is U.S. Pat. No. 5,528,666 having a system for allowing a user to expand their personal phone system with multiple portable units and additional telephone products. U.S. Pat. No. 5,454,350 has an electronic dialing attachment that is selectively coupled to a pet and can be removed and held near a touch tone phone and generates a touch tone signal for dialing the owner of the pet should the pet become lost.

While these devices fulfill their respective, particular objectives and requirements, the need remains for a device that has certain improved features that allow a user to communicate with a pet over the phone.

SUMMARY OF THE INVENTION

The present invention meets the needs presented above by providing a speaker member operationally coupled a processing assembly that is operationally coupled to a telephone jack that allows the user to audibly communicate with the pet through the speaker member.

Still yet another object of the present invention is to provide a new pet communication apparatus that provides comfort and reassurance to the pet by allowing the pet to hear the voice of the user.

Even still another object of the present invention is to provide a new pet communication apparatus that allows the user to hear the response of the pet to the voice of the user.

To this end, the present invention generally comprises a housing member being designed for being selectively positioned on a support surface. A processing assembly is positioned in the housing member. The processing assembly is designed for being operationally coupled to a telephone jack whereby the processing assembly is operationally coupled to a telephone company. A speaker member is operationally coupled to the processing assembly whereby the speaker member is designed for audibly reproducing audio spoken by the user calling the pet. The speaker member is coupled to the housing member whereby the speaker member is designed for audibly reproducing sounds to be heard by the pet.

An aspect of pet ownership that animals need to be happy is the interaction and communication they receive from their owners. Whether playing fetch with the dog, dangling a toy mouse in front of a playful cat, or simply just talking to their pets in a conversational manner, owners can see the joy and happiness in their pets' eyes when lavishing such attention on them. Accustomed to constant communication with their owners, pets can become quite lonely when left alone for an extended period of time. Unfortunately, it is simply not practical for pet owners to be at home at all times, as daily life requires them to go off to work, to school, or on important errands. In addition, a pet owning family may desire to take a vacation but cannot carry along the pet to where they are going. As a result, pets may become listless and sad when they cannot hear their owner's voice over a period of hours or even days. The pet communication apparatus provides that audible link between the owner and the pet.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new pet communication apparatus according to the present invention.

FIG. 2 is a bottom view of the present invention.

FIG. 3 is a schematic view of the present invention.

DESCRIPTION OF THE PREFERRED EMBODIMENT

With reference now to the drawings, and in particular to FIGS. 1 through 3 thereof, a new pet communication apparatus embodying the principles and concepts of the present invention and generally designated by the reference numeral 10 will be described.

As best illustrated in FIGS. 1 through 3, the pet communication apparatus 10 generally comprises a housing member 11 being designed for being selectively positioned on a support surface.

A processing assembly 12 is positioned in the housing member 11. The processing assembly 12 is designed for being operationally coupled to a telephone jack whereby the processing assembly 12 is operationally coupled to a telephone company.

A speaker member 13 is operationally coupled to the processing assembly 12 whereby the speaker member 13 is designed for audibly reproducing audio spoken by the user calling the pet. The speaker member 13 is coupled to the housing member 11 whereby the speaker member 13 is designed for audibly reproducing sounds to be heard by the pet.

A microphone member 14 is operationally coupled to the processing assembly 12. The microphone assembly is coupled to the housing member 11. The microphone member 14 is designed for receiving audible sounds produced by the pet and transmitting the audio to the processing assembly 12 to be transmitted to the user when the user has called the pet.

A volume control member 15 is operationally coupled between the speaker member 13 and the processing assembly 12. The volume control member 15 controls the loudness at which the speaker member 13 reproduces the audio spoken by the user. The volume control member 15 is coupled to the housing member 11 whereby the volume control member 15 is designed for being actuated by the user.

An input jack 16 is operationally coupled to the processing assembly 12. The input jack 16 is coupled to the housing whereby the input jack 16 is designed for receiving an input chord from the telephone jack. The input jack 16 is designed for permitting the processing assembly 12 to be selectively operationally coupled to the telephone jack.

A bypass assembly 17 is operationally coupled to the processing assembly 12 whereby the bypass assembly 17 is designed for being operationally coupled between the processing assembly 12 and the telephone jack. The bypass assembly 17 is designed for being operationally coupled to a telephone. The bypass assembly 17 actuates the processing assembly 12 to allow the call from the user to be directed to the speaker member 13 when the bypass assembly 17 receives a code from the user after the user has called. The bypass assembly 17 is designed for permitting the call from the user to go to the telephone when the bypass assembly 17 fails to receive the code from the user.

An output jack 18 is operationally coupled to the bypass assembly 17. The output jack 18 is coupled to the housing member 11 whereby the output jack 18 is designed for receiving an output chord from a telephone. The output jack 18 is designed for permitting the telephone to be selectively coupled to the bypass assembly 17.

A lid member 19 is selectively coupled to the housing member 11. The lid member 19 is designed for covering a power source selectively positioned in the housing member 11. The processing assembly 12 is designed for being coupled to the power supply whereby the processing assembly 12 is supplied power from the power supply.

A plurality of foot members 20 are coupled the housing member 11. Each of the foot members 20 is designed for being positioned between the housing member 11 and the support surface whereby each of the foot members 20 is for inhibiting the housing member 11 from damaging the support surface. Each of the foot members 20 comprises a frictional material. The friction material is designed for frictionally engaging the support surface whereby the foot members 20 are for inhibiting sliding of the housing member 11 across the support surface.

The housing member 11 comprises a plurality of mounting apertures 21. Each of the mounting apertures 21 extends into the housing member 11. Each of the mounting apertures 21 is designed for receiving one of plurality of mounting members extending outwardly from the support surface whereby the mounting apertures 21 are for allowing the housing member 11 to be mounted to the support surface when the support surface is positioned in a vertical orientation.

In use, the user connects the input jack 16 to the telephone jack and connects the output jack 18 to the telephone. The user then actuates the volume control member 15 to set the appropriate level that the speaker is to reproduce the audio from the user. The user can then call in and enter a code that is recognized by the bypass assembly 17 to allow the user to speak to the pet through the speaker member 13 and to hear the pet through the microphone member 14.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A pet communication apparatus for allowing a caller to communicate with a pet, the pet communication apparatus comprising:
    a housing member being adapted for being selectively positioned on a support surface;
    a processing assembly being positioned in said housing member, said processing assembly being adapted for being operationally coupled to a telephone jack such that said processing assembly is operationally coupled to a telephone company;
    a speaker member being operationally coupled to said processing assembly such that said speaker member is adapted for audibly reproducing audio spoken by the user calling the pet, said speaker member being coupled to said housing member such that said speaker member is adapted for audibly reproducing sounds to be heard by the pet; and
    a bypass assembly being operationally coupled to said processing assembly such that said bypass assembly is adapted for being operationally coupled between said processing assembly and the telephone jack, said bypass assembly receiving signals from said telephone jack, said bypass assembly being adapted for being operationally coupled to a telephone, said bypass assembly actuating said processing assembly to allow the call from the user to be directed to said speaker member when said bypass assembly receives a code from the user after the user has called, said bypass assembly being adapted for permitting the call from the user to go to the telephone when said bypass assembly fails to receive the code from the user.

2. The pet communication apparatus as set forth in claim 1, further comprising:
    a microphone member being operationally coupled to said processing assembly, said microphone assembly being coupled to said housing member, said microphone member being adapted for receiving audible sounds produced by the pet and transmitting the audio to said processing assembly to be transmitted to the user when the user has called the pet.

3. The pet communication apparatus as set forth in claim 1, further comprising:
    a volume control member being operationally coupled between said speaker member and said processing assembly, said volume control member controlling the loudness at which said speaker member reproduces the audio spoken by the user, said volume control member being coupled to said housing member such that said volume control member is adapted for being actuated by the user.

4. The pet communication apparatus as set forth in claim 1, further comprising:
    an input jack being operationally coupled to said processing assembly, said input jack being coupled to said housing such that said input jack is adapted for receiving an input chord from the telephone jack, said input jack being adapted for permitting said processing assembly to be selectively operationally coupled to the telephone jack.

5. The pet communication apparatus as set forth in claim 1, further comprising:

an output jack being operationally coupled to said bypass assembly, said output jack being coupled to said housing member such that said output jack is adapted for receiving an output chord from a telephone, said output jack being adapted for permitting the telephone to be selectively coupled to said bypass assembly.

6. The pet communication apparatus as set forth in claim 1, further comprising:
a lid member being selectively coupled to said housing member, said lid member being adapted for covering a power source selectively positioned in said housing member, said processing assembly being adapted for being coupled to the power supply such that said processing assembly is supplied power from the power supply.

7. The pet communication apparatus as set forth in claim 1, further comprising:
a plurality of foot members being coupled said housing member, each of said foot members being adapted for being positioned between said housing member and the support surface such that each of said foot members are for inhibiting said housing member from damaging the support surface.

8. The pet communication apparatus as set forth in claim 7, further comprising:
each of said foot members comprising a frictional material, said friction material being adapted for frictionally engaging the support surface such that said foot members are for inhibiting sliding of said housing member across the support surface.

9. The pet communication apparatus as set forth in claim 1, further comprising:
said housing member comprising a plurality of mounting apertures, each of said mounting apertures extending into said housing member, each of said mounting apertures being adapted for receiving one of plurality of mounting members extending outwardly from the support surface such that said mounting apertures are for allowing said housing member to be mounted to the support surface when the support surface is positioned in a vertical orientation.

10. A pet communication apparatus for allowing a caller to communicate with a pet, the pet communication apparatus comprising:
a housing member being adapted for being selectively positioned on a support surface;
a processing assembly being positioned in said housing member, said processing assembly being adapted for being operationally coupled to a telephone jack such that said processing assembly is operationally coupled to a telephone company;
a speaker member being operationally coupled to said processing assembly such that said speaker member is adapted for audibly reproducing audio spoken by the user calling the pet, said speaker member being coupled to said housing member such that said speaker member is adapted for audibly reproducing sounds to be heard by the pet;
a microphone member being operationally coupled to said processing assembly, said microphone assembly being coupled to said housing member, said microphone member being adapted for receiving audible sounds produced by the pet and transmitting the audio to said processing assembly to be transmitted to the user when the user has called the pet;
a volume control member being operationally coupled between said speaker member and said processing assembly, said volume control member controlling the loudness at which said speaker member reproduces the audio spoken by the user, said volume control member being coupled to said housing member such that said volume control member is adapted for being actuated by the user;
an input jack being operationally coupled to said processing assembly, said input jack being coupled to said housing such that said input jack is adapted for receiving an input chord from the telephone jack, said input jack being adapted for permitting said processing assembly to be selectively operationally coupled to the telephone jack;
a bypass assembly being operationally coupled to said processing assembly such that said bypass assembly is adapted for being operationally coupled between said processing assembly and the telephone jack, said bypass assembly receiving signals from said telephone jack, said bypass assembly being adapted for being operationally coupled to a telephone, said bypass assembly actuating said processing assembly to allow the call from the user to be directed to said speaker member when said bypass assembly receives a code from the user after the user has called, said bypass assembly being adapted for permitting the call from the user to go to the telephone when said bypass assembly fails to receive the code from the user;
an output jack being operationally coupled to said bypass assembly, said output jack being coupled to said housing member such that said output jack is adapted for receiving an output chord from a telephone, said output jack being adapted for permitting the telephone to be selectively coupled to said bypass assembly;
a lid member being selectively coupled to said housing member, said lid member being adapted for covering a power source selectively positioned in said housing member, said processing assembly being adapted for being coupled to the power supply such that said processing assembly is supplied power from the power supply;
a plurality of foot members being coupled said housing member, each of said foot members being adapted for being positioned between said housing member and the support surface such that each of said foot members are for inhibiting said housing member from damaging the support surface;
each of said foot members comprising a frictional material, said friction material being adapted for frictionally engaging the support surface such that said foot members are for inhibiting sliding of said housing member across the support surface; and
said housing member comprising a plurality of mounting apertures, each of said mounting apertures extending into said housing member, each of said mounting apertures being adapted for receiving one of plurality of mounting members extending outwardly from the support surface such that said mounting apertures are for allowing said housing member to be mounted to the support surface when the support surface is positioned in a vertical orientation.

\* \* \* \* \*